(12) United States Patent
Huang (10) Patent No.: US 7,760,268 B2
(45) Date of Patent: Jul. 20, 2010

(54) TELEVISION SET HAVING POWER FREQUENCY CARRIER

(75) Inventor: Yuan-Yu Huang, Taipei (TW)

(73) Assignee: Hansder Engineering Co., Ltd., Taipei (TW)

( * ) Notice: Subject to any disclaimer, the term of this patent is extended or adjusted under 35 U.S.C. 154(b) by 1049 days.

(21) Appl. No.: 11/480,438

(22) Filed: Jul. 5, 2006

(65) Prior Publication Data

US 2007/0067819 A1    Mar. 22, 2007

(51) Int. Cl.
*H04N 5/44* (2006.01)
*H04N 5/63* (2006.01)

(52) U.S. Cl. .................. 348/553; 348/725; 348/730

(58) Field of Classification Search ............... 348/553, 348/730, 725, 724; 725/130, 100, 131, 139, 725/150, 151; *H04N 5/44, 5/63*
See application file for complete search history.

(56) References Cited

U.S. PATENT DOCUMENTS 5,630,204 A * 5/1997 Hylton et al. ............... 725/131
5,877,821 A * 3/1999 Newlin et al. ............... 348/724

* cited by examiner

*Primary Examiner*—Sherrie Hsia
(74) *Attorney, Agent, or Firm*—Jackson IPG PLLC (57) ABSTRACT

By utilizing a power frequency carrier provided by an indoor power line, multimedia data is transferred to a converter to be converted for being displayed on an output display of a television so that the multimedia data can be transferred along the indoor power line to save indoor lines.

11 Claims, 9 Drawing Sheets

TELEVISION SET HAVING POWER FREQUENCY CARRIER

FIELD OF THE INVENTION

The present invention relates to a television; more particularly, relates to transferring multimedia data through an indoor power line to a television to save indoor lines.

DESCRIPTION OF THE RELATED ART(S)

Figure 8:
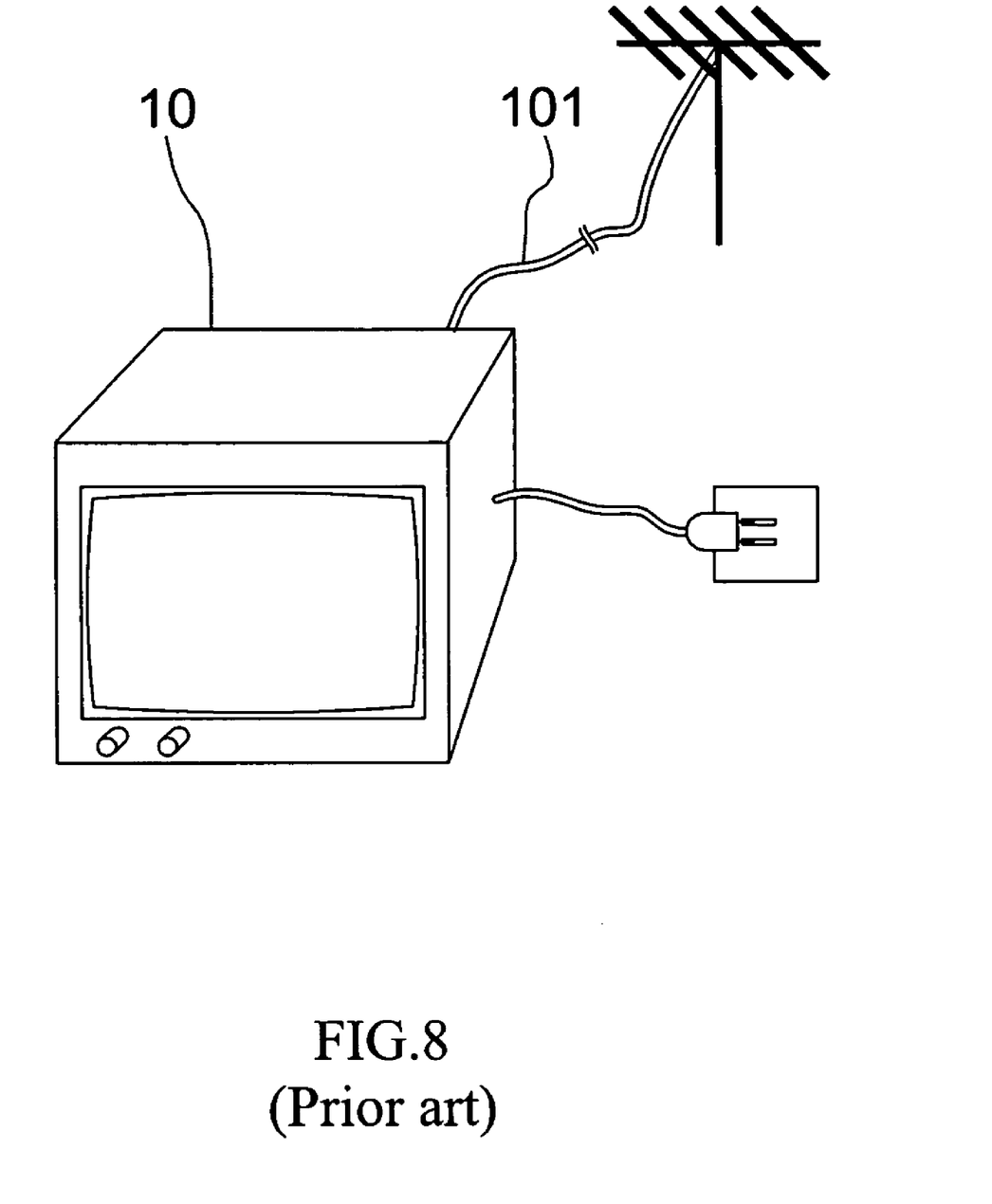
FIG. 8 is a structural view showing a television of a prior art receiving signal data.
Figure 9:
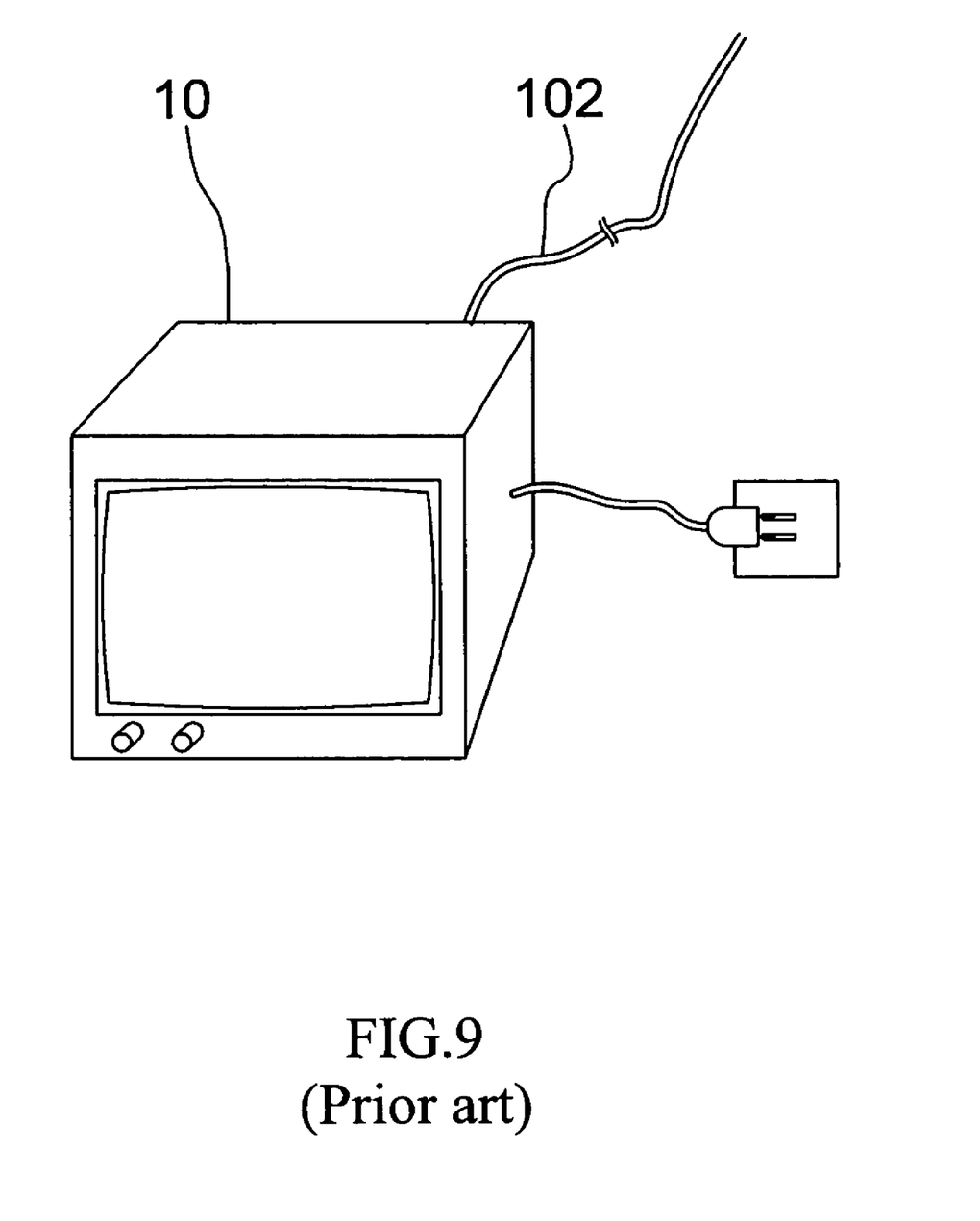
FIG. 9 is a structural view showing a television of another prior art receiving signal data.

When watching programs on a wireless television or a cable television (CATV), a television 10 according to a prior art is connected with an antenna 101 or a CATV cable 102 for receiving signal data to be displayed on a screen of the television 10.

Although signal data is received by the antenna 101 or the CATV cable 102 to be displayed by the television 10, old buildings seldom leave room in advance for connecting the antenna 101 or the CATV cable 102. Therefore, general people locate their televisions at default positions while using longer signal lines extended to the outside to connect to the antenna 101 or the CATV cable 102. Not to mention if there are additional devices (such as DVD players PS2 players, MTV players, etc.), extra lines has to be used for transferring signal data in between. So, in addition to the power line, there are many complicated lines like a chaos at the back of the television.

If a building leaves room for connecting the antenna 101 or the CATV cable 102 in advance, the location for the room left is predestined. The user has to accommodate himself to its terminal for connecting to the antenna 101 or the CATV cable 102, which makes the problem happens as usual. So, the prior arts do not fulfill users' requests on actual use.

SUMMARY OF THE INVENTION

Therefore, the main purpose of the present invention is to transfer multimedia data to a television over a power frequency carrier, provided by an indoor power line, in an indoor power line; and, then, to be converted by a converter built in the television to be shown on an output display of the television, so that the multimedia data is transferred through the indoor power line to the television to be displayed and to save indoor lines.

To achieve the above purpose, the present invention is a television set having a power frequency carrier, comprising a television with an output display and an in put power source; a converter deposed in the television with a single-chip control module, a power carrier module, an output module connected to the output display, and an input module connected to the in put power source; an indoor power line connected to the input power source; and a multimedia transmittal part connected to the indoor power line.

BRIEF DESCRIPTIONS OF THE DRAWINGS

The present invention will be better understood from the following detailed descriptions of the preferred embodiments according to the present invention, taken in conjunction with the accompanying drawings, in which.

DESCRIPTION OF THE PREFERRED EMBODIMENTS

The following descriptions of the preferred embodiments are provided to understand the features and the structures of the present invention.

Figure 1:
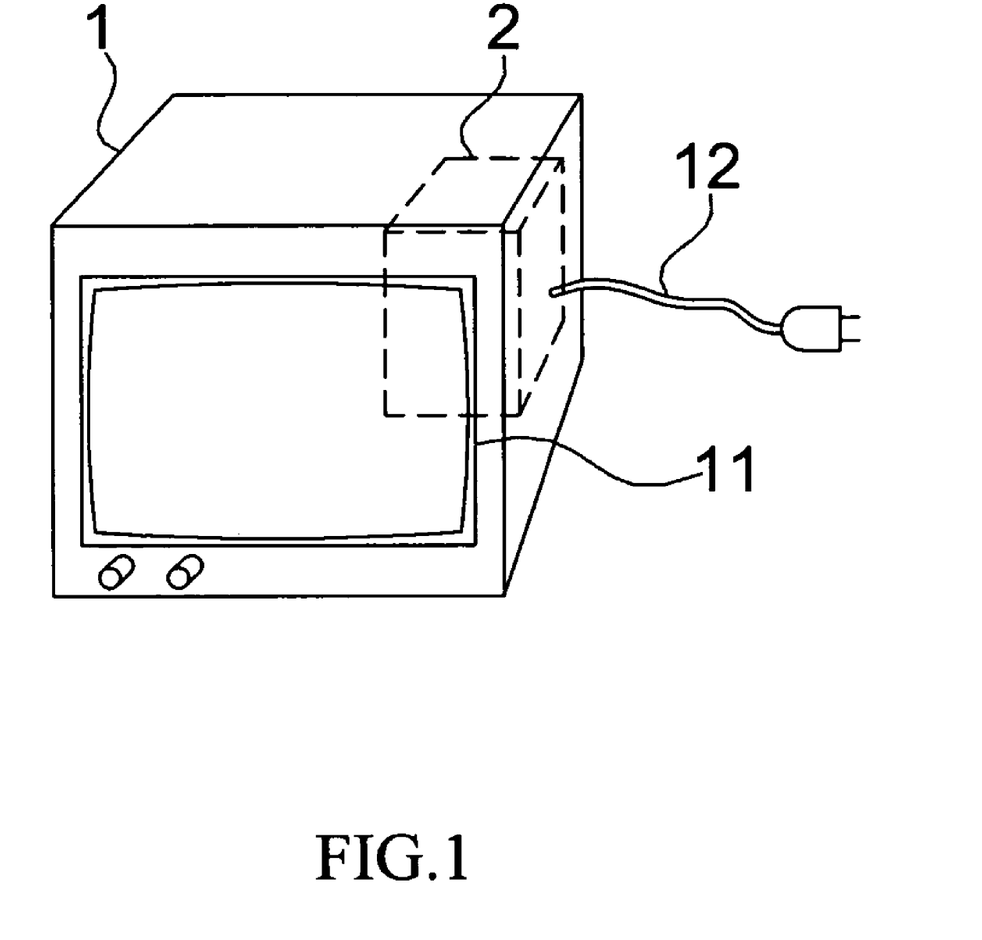
FIG. 1 is a perspective view showing a television according to the present invention.
Figure 2:
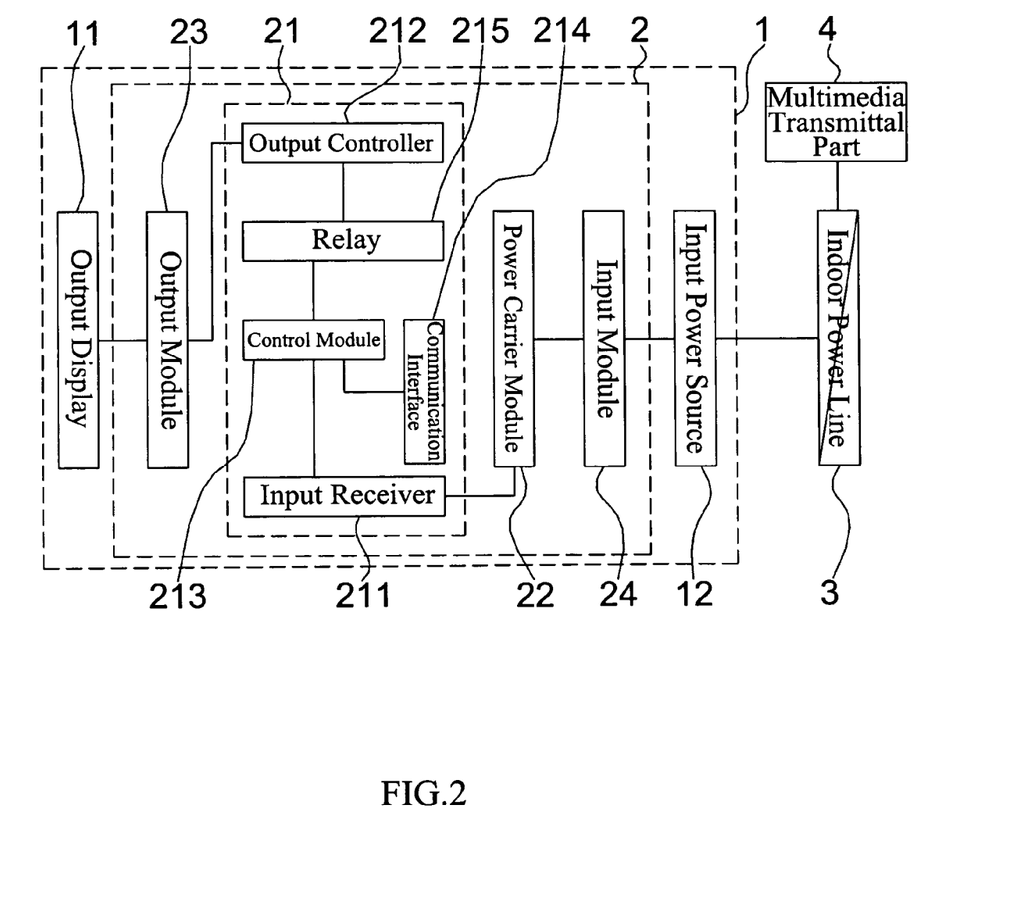
FIG. 2 is a view showing a structural diagram according to the present invention.

Please refer to FIG. 1 and FIG. 2, which are a perspective view showing a television and a view showing a structural diagram, according to the present invention. As shown in the figures, the present invention is a television set having a power frequency carrier, comprising a television 1, a converter 2, an indoor power line 3 and a multimedia transmittal part 4, where multimedia data is transmitted to the television 1 through the indoor power line 3 to save indoor lines.

The television 1 comprises electrical devices (not shown in the figures), an output display 11 and an input power source 12.

The converter is deposed in the television 1, comprising a single-chip control module 21, a power carrier module 22 with a transmission baud rate of 1200 BPS, an output module 23 connected to the output display 11, and an input module 24 connected with the input power source 12. Therein, the single-chip control module 21 comprises an input receiver 211, an output controller 212, a control module 213, a communication interface 214 and a relay 215; the control module 213 is a processor of a 8051 single-chip with a working frequency up to 16 MHz together with a 4 k size of electrically programmable and erasable ROM (Read Only Memory) together with eight input pins and eight output pins; and, the relay 215 is located at the output pins to quarantine the circuit for securing and ensuring the operation of the single-chip control module 21. The 8051 single-chip contains a full-duplex communication interface 214 inside; the communication interface 214 can be an RS232 interface to transfer and receive data simultaneously from outside. Because the operational signals are on a TTL (transistor-transistor-logic) level (0 voltage set as logic 0; +5 voltage set as logic 1) and the communication interface 214 is a serial communication interface to transfer or receive data in a form of series of bits, linkages can be easily established between two objects of controllers (such as absorbing carriers or automatic measuring devices), equipments, computers, or any combination.

The indoor power line 3 is a general indoor power source for the input power source 12 to plug in.

The multimedia transmittal part 4 is connected to the indoor power line 3, which can be a CATV cable or a cable for transmitting multimedia data from a satellite. The indoor power line 3 is connected to the input power source 12 to provide a power frequency carrier for transmitting the multimedia data to the converter 2 through the indoor power line 3. Hence, a novel television having a power frequency carrier is obtained with the above structure.

Figure 3:
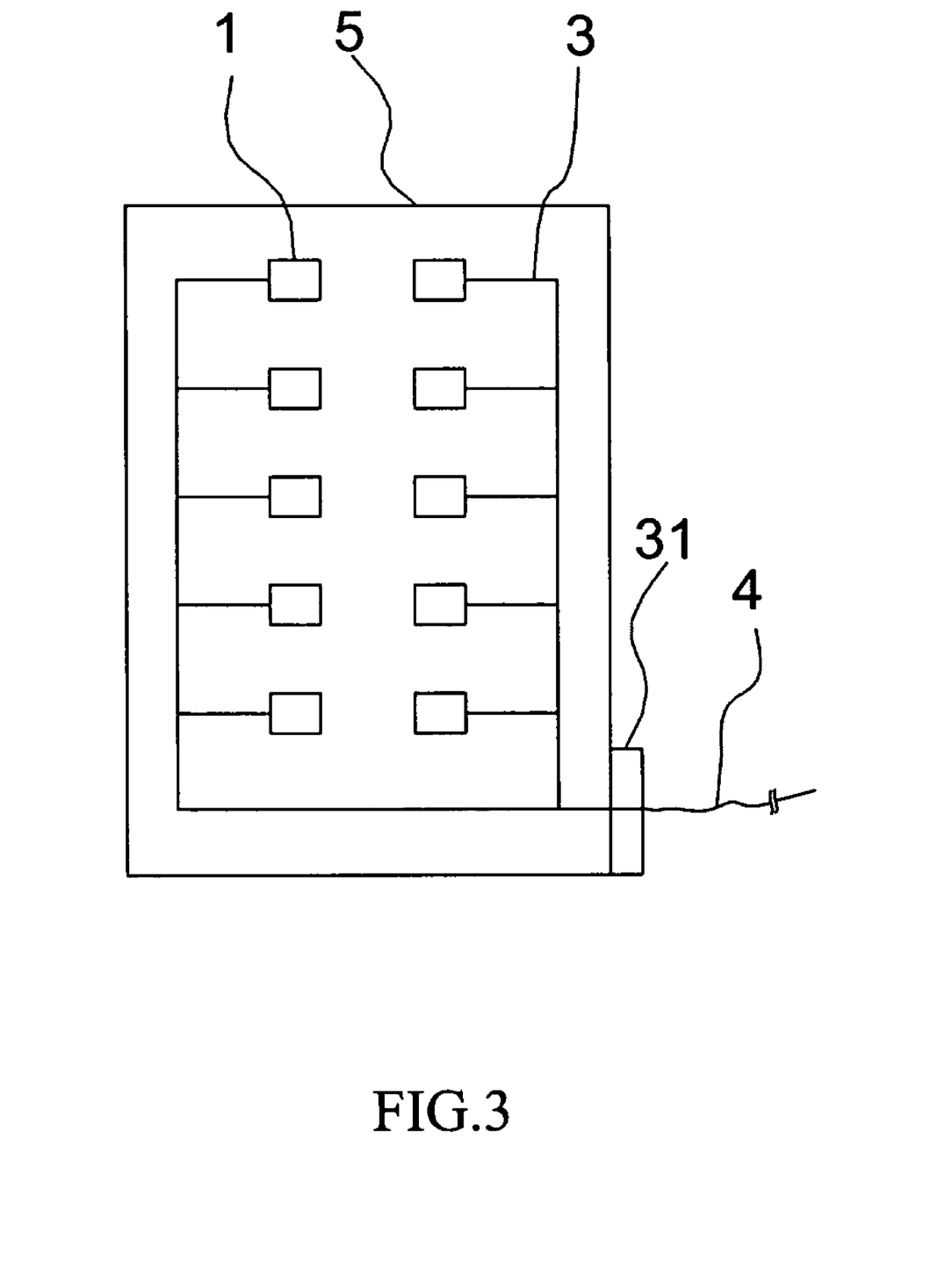
FIG. 3 is a view showing a status of use for a CATV (cable television) cable according to the present invention.
Figure 4:
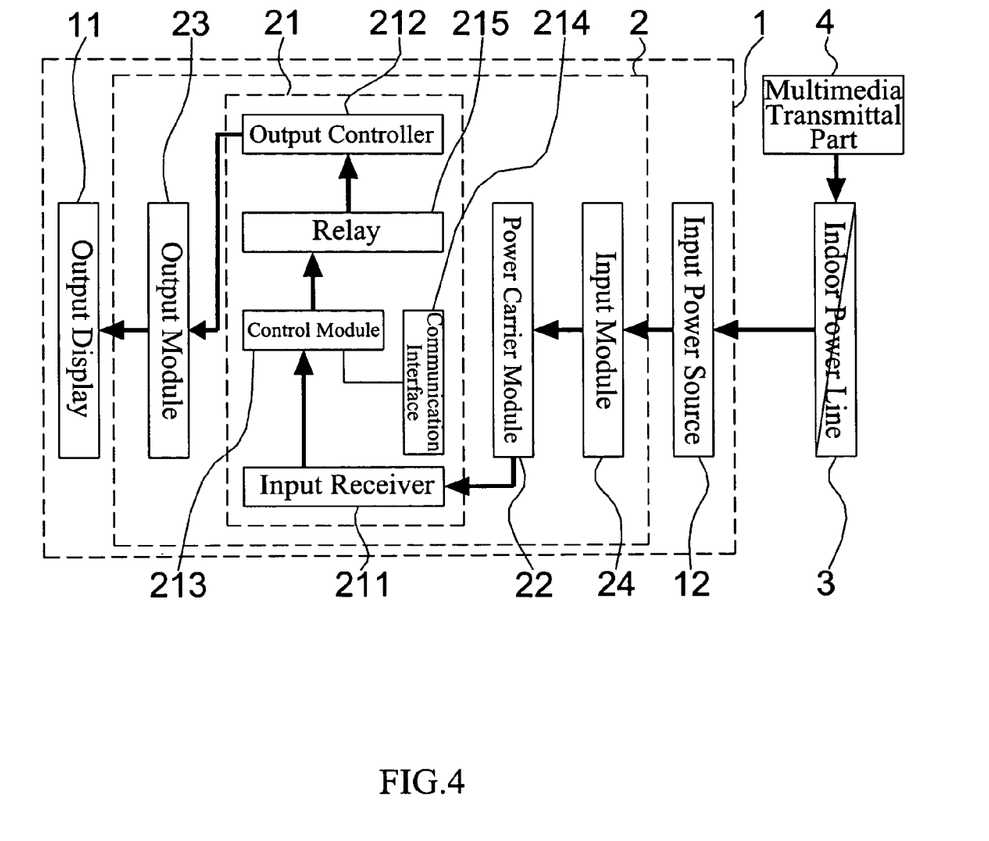
FIG. 4 is a view showing a status of use for the structural diagram according to the present invention.

Please refer to FIG. 3 and FIG. 4, which are views showing statuses of use for a CATV cable and for the structural diagram, according to the present invention. As shown in the figures, when using the present invention for a CATV cable, a multimedia transmittal part 4 of a CATV cable is connected to a head power source 31 of an indoor power line 3 in a building 5; and, an input power source 12 of a television 1 for a householder in the building 5 is plugged in the indoor power line 3. When the householder turns on the television 1, multimedia data from the multimedia transmittal part 4 is transmitted to the input power source 12 of the television 1 through the indoor power line 3; and, then, is transferred from the in put power source 12 to a converter 2 to be received. After the multimedia data transferred through the indoor power line 3 is received by the converter 2, the multimedia data is transmitted to a power carrier module 22 as passing through an input module 24 of the converter 2. After being modulated by the power carrier module 22, the multimedia data is then transmitted to an input receiver 211 of a single-chip control module 21; after being received by the input receiver 211, is transmitted to an output controller 212 by a control module 213 and a relay 215; and, then, is transmitted to an output module 23 by the output controller 212. Finally, an image or a video of the multimedia data transferred by the multimedia transmittal part 4 is displayed on an output display 11 of the television 1. In this way, multimedia data can be transferred to a television by an indoor power line to save indoor lines.

Figure 5:
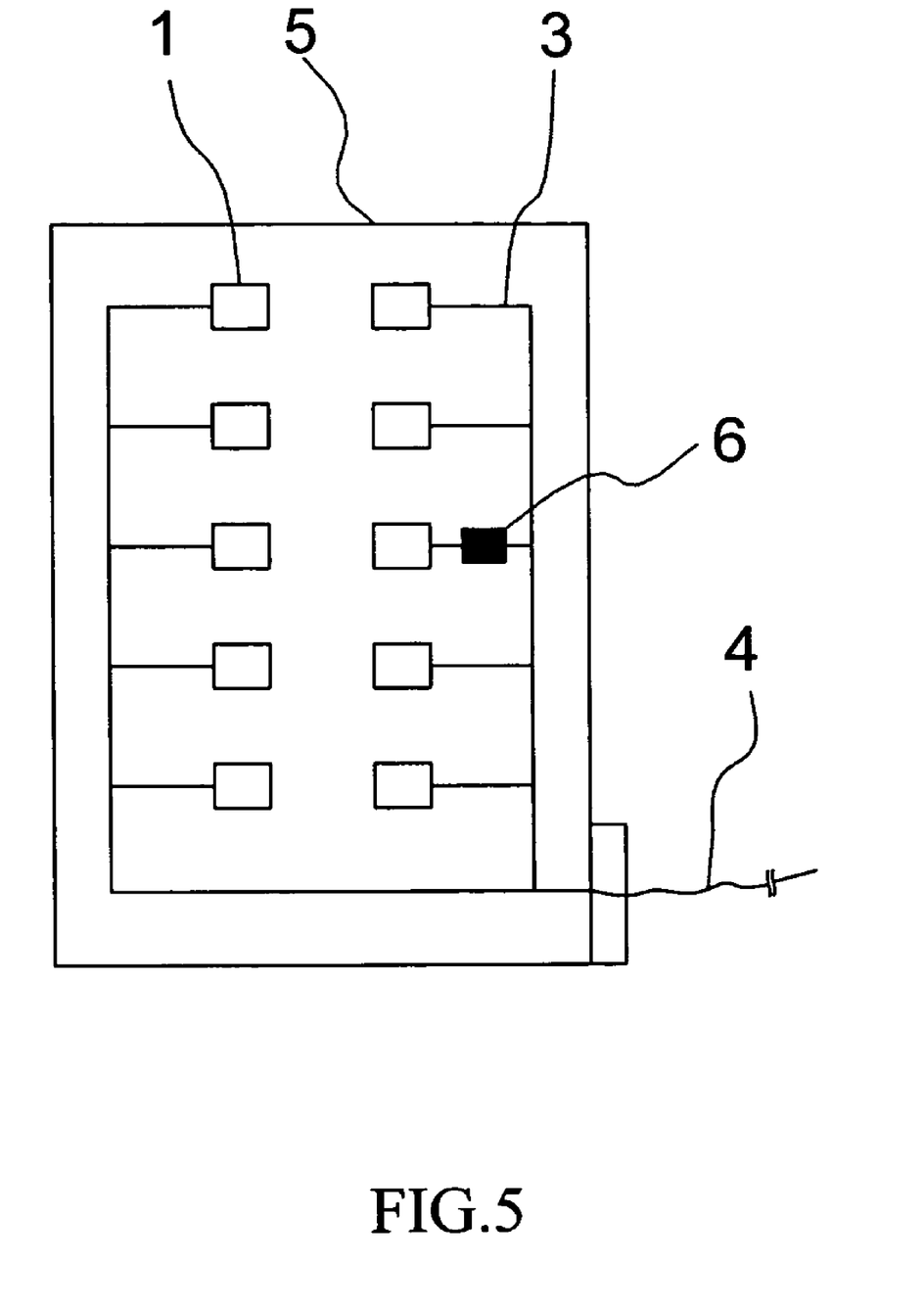
FIG. 5 is a view showing another status of use according to the present invention.

Please refer to FIG. 5, which is a view showing another status of use according to the present invention. As shown in the figure, when the present invention is used in a building 5, if a householder does not want to receive multimedia data from an indoor power line 3, a wave filter 6 can be set at an end of the indoor power line 3 to filter a power frequency carrier and the multimedia data thereon so that the multimedia data on the power frequency carrier provided by the indoor power line 3 is prevented from being transferred to a television 1 of the householder. And, if the householder wants to receive the multimedia data again, all what is required to do is only to remove the wave filter 6.

Figure 6:
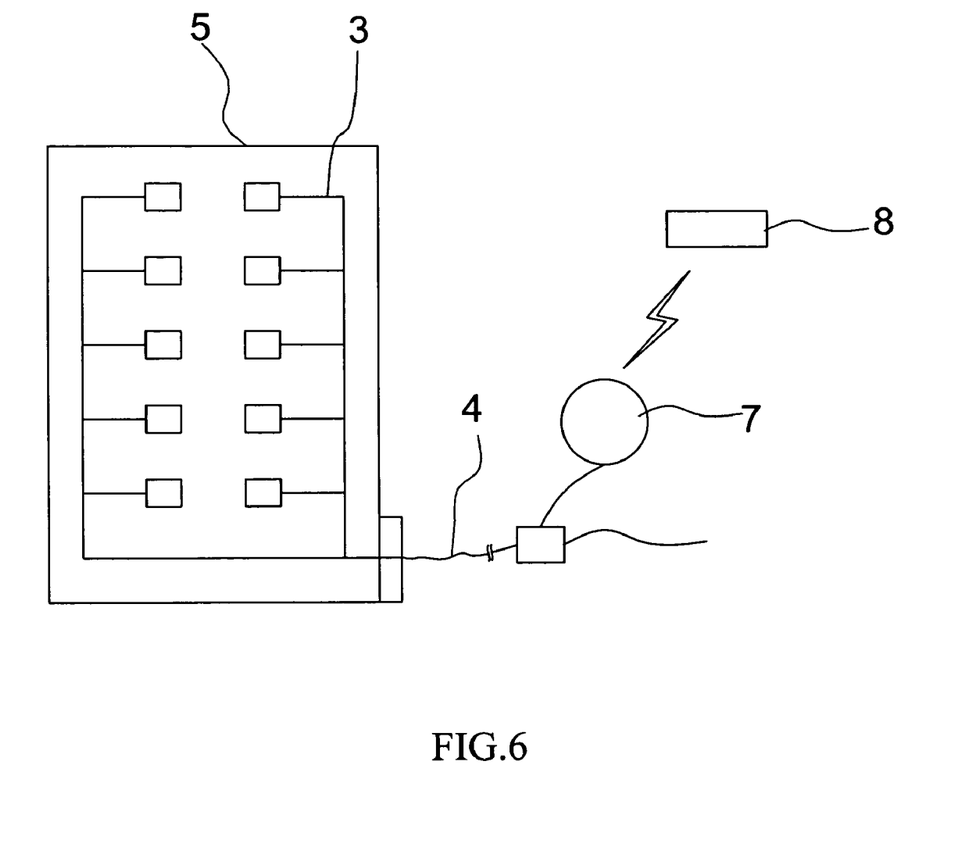
FIG. 6 is a view showing a status of use for a cable transmitting multimedia data from a satellite according to the present invention.

Please refer to FIG. 6, which is a view showing a status of use for a cable transmitting multimedia data from a satellite according to the present invention. As shown in the figure, according to the present invention, when multimedia data is transferred from a satellite 8, an antenna 7 is used to receive the multimedia data. Then, the multimedia data is transferred along a multimedia transmittal part 4 connecting to an indoor power line 3 of a building 5 to be displayed on a television 1. By doing so, multimedia data transferred from satellite can be transmitted along indoor power line to be displayed and watched.

Figure 7:
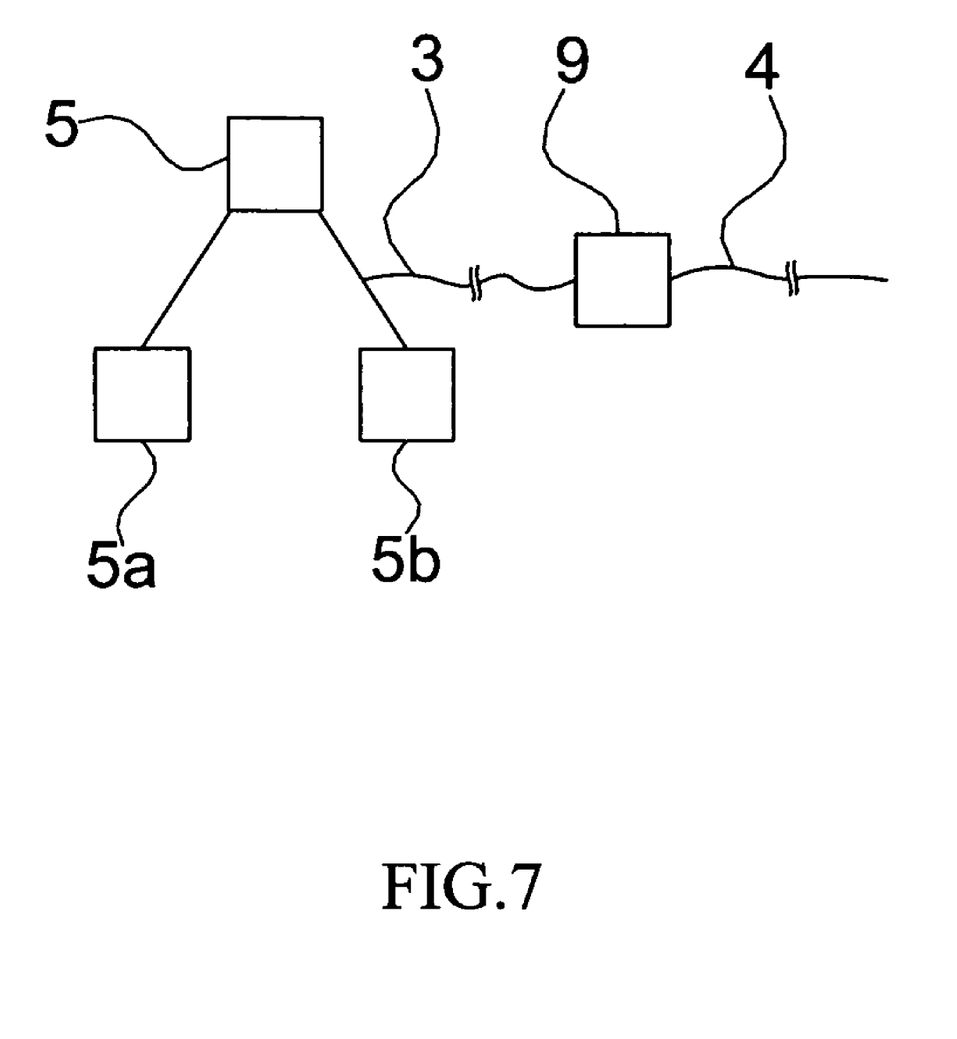
FIG. 7 is a view showing another structural diagram according to the present invention.

Please refer to FIG. 7, which is a view showing another structural diagram according to the present invention. As shown in the figure, when the present invention is applied to several buildings 5, 5a, 5b, a relay module can be set between a multimedia transmittal part 4 and an indoor power line 3 so that the multimedia transmittal part 4 and the indoor power line 3 is integrated to connect to the buildings 5, 5a, 5b.

To sum up, the present invention is a television set having a power frequency carrier, where multimedia data over a power frequency carrier in an indoor power line is transferred to a converter built in a television to be converted for being displayed on an output display of the television so that multimedia data can be transferred by an indoor power line to be displayed by a television and indoor lines required can be lessened.

The preferred embodiments herein disclosed are not intended to unnecessarily limit the scope of the invention. Therefore, simple modifications or variations belonging to the equivalent of the scope of the claims and the instructions disclosed herein for a patent are all within the scope of the present invention.

What is claimed is:

1. A television set having a power frequency carrier, comprising:
   (a) a television having
      (i) an output display, and
      (ii) an input power source,
   (b) a converter deposed in said television, comprising:
      (i) a single-chip control module,
      (ii) a power carrier module,
      (iii) an output module connected to said output display, and
      (iv) an input module connected to said input power source;
   (c) an indoor power line connected to said in put power source; and
   (d) a multimedia transmittal part connected to said indoor power line,
   wherein multimedia data is transmitted by said indoor power line to said converter over a power frequency carrier provided by said indoor power line.

2. The television set according to claim 1, wherein said single-chip control module comprises
   (1) an input receiver,
   (2) an output controller,
   (3) a control module,
   (4) a communication interface and
   (5) a relay.

3. The television set according to claim 2, wherein said control module is a 8051 single-chip.

4. The television set according to claim 2, wherein a working frequency of said control module is 16 MHz.

5. The television set according to claim 2, wherein said communication interface is an RS232 interface.

6. The television set according to claim 1, wherein a transmittal baud rate of said power carrier module is 1200 BPS.

7. The television set according to claim 1, wherein said indoor power line is a general indoor power source.

8. The television set according to claim 1, wherein said multimedia transmittal part is a CATV (cable television) cable.

9. The television set according to claim 1, wherein said multimedia transmittal part is a cable transmitting multimedia data from a satellite.

10. The television set according to claim 1, wherein a wave filter is located at an end of said indoor power line to filter said power frequency carrier and said multimedia data on said power frequency carrier.

11. The television set according to claim 1, wherein a relay module is deposed between said multimedia transmittal part and said indoor power line.

* * * * *